(12) United States Patent
Calagaz

(10) Patent No.: US 12,080,146 B2
(45) Date of Patent: Sep. 3, 2024

(54) SYSTEM AND METHOD FOR TRACKING THE POSITION OF A SMART PLUG

(71) Applicant: Fishing Chaos, Inc., Mobile, AL (US)

(72) Inventor: John Calagaz, Mobile, AL (US)

(73) Assignee: Fishing Chaos, Inc., Mobile, AL (US)

( * ) Notice: Subject to any disclaimer, the term of this patent is extended or adjusted under 35 U.S.C. 154(b) by 171 days.

(21) Appl. No.: 17/869,867

(22) Filed: Jul. 21, 2022

(65) Prior Publication Data

US 2023/0025384 A1 Jan. 26, 2023

Related U.S. Application Data

(60) Provisional application No. 63/224,132, filed on Jul. 21, 2021.

(51) Int. Cl.
*G08B 21/24* (2006.01)
*B63B 17/00* (2006.01)
*G01C 21/00* (2006.01)
*G01C 21/20* (2006.01)

(52) U.S. Cl.
CPC ............. *G08B 21/24* (2013.01); *B63B 17/00* (2013.01); *G01C 21/005* (2013.01); *G01C 21/20* (2013.01)

(58) Field of Classification Search
CPC .......... G08B 21/24; G08B 5/38; G08B 13/08; B63B 17/00; B63B 79/40; B63B 13/02; G01C 21/005; G01C 21/20
USPC ....................................................... 114/197
See application file for complete search history.

(56) References Cited

U.S. PATENT DOCUMENTS

| | | | | |
|---|---|---|---|---|
| 4,019,454 A | * | 4/1977 | Landwerlen | B63B 13/00 114/197 |
| 5,047,753 A | * | 9/1991 | Birchfield | B63B 13/02 200/61.42 |
| 5,182,556 A | * | 1/1993 | Plost | B63B 13/00 340/568.1 |
| D380,726 S | * | 7/1997 | Coulter | D12/317 |
| 5,966,080 A | * | 10/1999 | Bigsby | B63J 99/00 340/687 |
| 6,035,702 A | * | 3/2000 | Graham | B63B 13/00 73/49.8 |
| 6,357,376 B1 | * | 3/2002 | Purio | F16K 31/22 114/183 R |
| 6,928,943 B1 | * | 8/2005 | Neubauer | B63B 13/00 114/197 |

(Continued)

*Primary Examiner* — Curtis J King
(74) *Attorney, Agent, or Firm* — AdamsIP, LLC; Edward B. Garner, III; J. Hunter Adams

(57) ABSTRACT

A system and method for tracking the position of a smart plug on a marine vehicle is provided. Generally, the system and method of the present disclosure are designed to generate indicia used to alert a user of the position of the smart plug on a marine vehicle so that the user may properly position the smart plug on the marine vehicle prior to launching said marine vehicle in a body of water. The system generally comprises a smart plug, a plug sensor, a processor operably connected to the plug sensor, and a non-transitory computer-readable medium coupled to the processor and having instructions stored thereon. In some preferred embodiments, a computing device having a user interface may be operably connected to the processor. At least one sensor of the smart plug collects data that may be used by the system to alert a user to secure the smart plug in the drain hole.

20 Claims, 11 Drawing Sheets

(56) References Cited

U.S. PATENT DOCUMENTS

| | | | | |
|---|---|---|---|---|
| 6,973,891 B1* | 12/2005 | Warner | ............... | B63B 13/00 |
| | | | | 114/197 |
| 7,102,510 B2* | 9/2006 | Boling | ............... | G08G 1/205 |
| | | | | 340/686.1 |
| 7,191,722 B1* | 3/2007 | Plost | ............... | B63B 43/02 |
| | | | | 114/197 |
| 7,191,723 B1* | 3/2007 | Bradford | ............... | B25B 15/02 |
| | | | | 114/221 R |
| 7,699,013 B1* | 4/2010 | Kreisel | ............... | B63B 13/00 |
| | | | | 114/198 |
| 8,924,166 B2* | 12/2014 | Von Herzen | ............... | G01N 33/30 |
| | | | | 702/50 |
| 9,327,651 B1* | 5/2016 | Steil | ............... | B63B 13/00 |
| 2006/0260525 A1* | 11/2006 | DeHart | ............... | B63B 13/00 |
| | | | | 114/197 |
| 2006/0266272 A1* | 11/2006 | Bernath | ............... | B63B 13/00 |
| | | | | 114/197 |
| 2009/0260557 A1* | 10/2009 | Colsher | ............... | B63B 13/02 |
| | | | | 114/197 |
| 2013/0074760 A1* | 3/2013 | VanNimwegen | ............... | B63B 34/20 |
| | | | | 114/362 |
| 2014/0261130 A1* | 9/2014 | Harkness | ............... | B63B 13/00 |
| | | | | 114/221 R |
| 2022/0144383 A1* | 5/2022 | Herrema | ............... | F16K 31/44 |
| 2022/0380003 A1* | 12/2022 | Marsh | ............... | B63B 34/21 |

\* cited by examiner

SYSTEM AND METHOD FOR TRACKING THE POSITION OF A SMART PLUG

CROSS REFERENCES

This application claims the benefit of U.S. Provisional Application No. 63/224,132 filed on Jul. 21, 2021, wherein said application is incorporated herein by reference.

FIELD OF THE DISCLOSURE

The subject matter of the present disclosure refers generally to a system and method for tracking the position of a smart plug.

BACKGROUND

In general, most marine vehicles include a drain port and removable drain plug located at low points of said marine vehicle for the purpose of draining bilge water that may accumulate at said low points. The drainage of said bilge water not only prevents damage that standing water may cause to a boat's interior, but it is legally required in some states to remove the boat plug from the drain port after removal from a body of water as a way to limit the spread of invasive species. In other words, users of marine vehicles traveling across state lines might unknowingly be in violation of a state laws that don't exist in their home state should they fail to remove the drain plug prior to trailering their marine vehicle on a public roadway in states having said laws. Unfortunately, it can be difficult for users of marine vehicles to keep up with the position of a drain plug on the marine vehicle; therefore, many users of marine vehicles might be at risk of violating said laws while traveling with said marine vehicle.

Further, current drain ports include a body mounted through the transom of the marine vehicle with a drain plug that is removable from an exterior side of the marine vehicle through said body and drain port. The drain plug typically has a mechanism to keep it from falling or getting lost when uninstalled, but this mechanism is not always permanent and subject to failure, resulting in the loss of said drain plug. Nor is it uncommon for users of marine vehicles to simply misplace the drain plug once removed from the drain port. This is especially true when a drain plug is removed prior to trailering the marine vehicle on a public roadway. Moreover, it isn't uncommon for users of marine vehicles to forget to install the drain plug within the drain port prior to launching the marine vehicle in a body of water, creating a hazard for the user since water will enter the bilge freely and possibly cause the boat to sink. Further, should the user of the marine vehicle launch said marine vehicle in a body of water without first installing the boat plug into the drain port, the user will often have to remove the marine vehicle from the body of water before the drain plug can be correctly positioned within the port, resulting in more work and a loss of time.

Accordingly, there is a need in the art for a system and method for tracking the position of a boat plug in order to assist user of marine vehicles to correctly position the boat plug on said marine vehicle.

SUMMARY

A system and methods for alerting a user when a smart plug is not properly positioned within a drain hole is provided. In one aspect, the system alerts a user to install or remove a smart plug from their marine vehicle when entering or leaving the water, respectively. In another aspect, the system warns a user when the user is in danger of leaving the smart plug in a location away from where it can easily be installed within the marine vehicle. Generally, the system obtains the location of the smart plug, marine vehicle, and/or smart plug to determine if the smart plug needs to be installed/removed from the marine vehicle as well as to prevent the loss of the smart plug. The system generally comprises a smart plug, a plug sensor, a processor operably connected to the plug sensor, and a non-transitory computer-readable medium coupled to the processor and having instructions stored thereon. The processor is configured to receive geolocation data and then use this information to determine when to install/remove the smart plug and/or when the smart plug is no longer located within a designated distance from the marine vehicle.

In some preferred embodiments, a computing entity having a user interface may be operably connected to the processor. The computing entity may comprise a user interface that may allow a user to view data of the system and/or cause the system to perform an action via commands input by said user. A database may be used to store condition data and building data gathered by the system. A wireless communication interface may allow the processor to receive audio data in the form of radio waves or as digital data. The smart plug is preferably a boat plug comprising a casing, control board, at least one sensor, power supply, and plug transmitter. The casing is shaped to fit a drain hole of the marine vehicle such that said casing will fill said drain hole in a way such that water is prevented from entering said marine vehicle through said drain hole. The casing preferably comprises a male portion and a female portion, wherein said male portion and said female portion are configured to interlock with one another. The physical features of the female portion preferably substantially conform to the physical features of the drain hole. The aperture section of the female portion of said casing is preferably aligned such that it is aligned with the drain hole, allowing said male portion of the casing to be secured to the female portion via said aperture section of said female portion and through said drain hole.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a system and method capable of managing the position of a smart plug.

Figure 1:
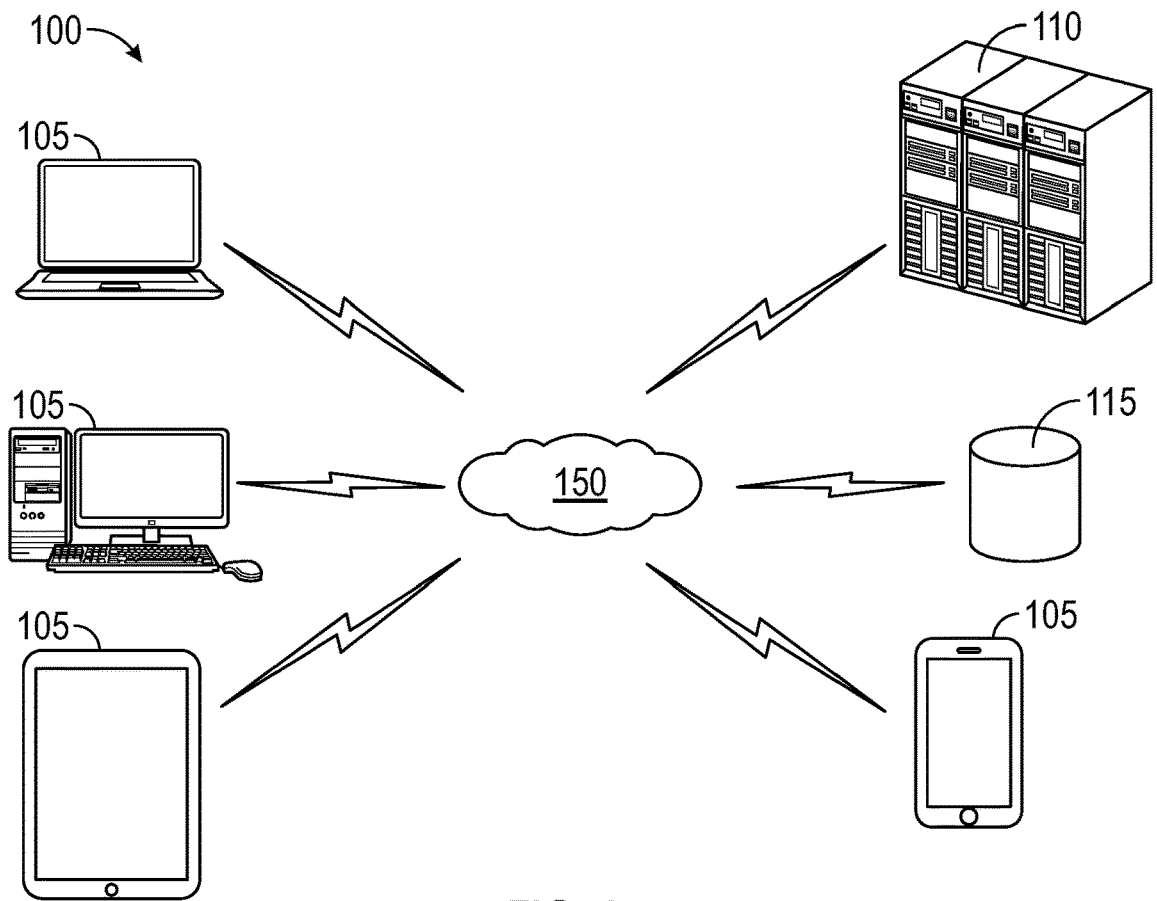
FIG. 1 is a diagram illustrating a system embodying features consistent with the principles of the present disclosure.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document.

Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
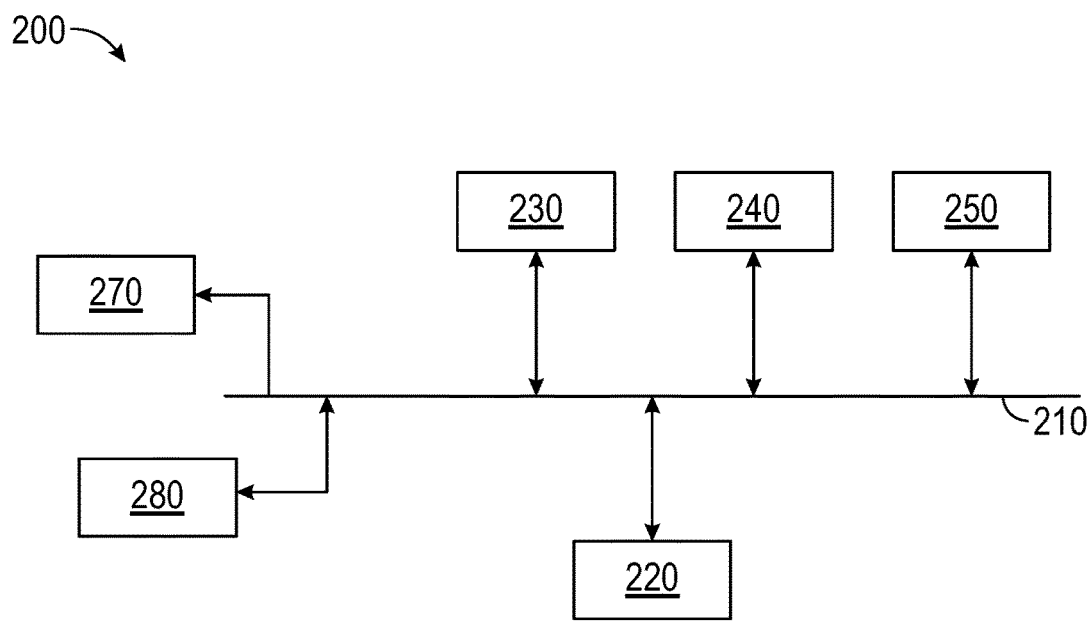
FIG. 2 is a diagram illustrating a system embodying features consistent with the principles of the present disclosure.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of processor or microprocessor suitable for interpreting and executing computer readable instructions. The processor 220 is configured to perform the operations disclosed herein based on instructions stored within the system 400. The processor 220 may process instructions for execution within computing device 350, including instructions stored in memory or on a storage device, to display graphical information for a graphical user interface (GUI) on an external input/output device, such as a display 316. The processor 220 may provide for coordination of the other components of a computing device 350, such as control of user interfaces 411, applications run by a computing device 350, and wireless communication by a communication device of the computing device 350. In some embodiments, the processor 220 may have a memory device therein or coupled thereto suitable for storing environmental data 430A, geographic zones 430B, threshold limits 430C, or other information or material disclosed herein. In some instances, the processor 220 may be a component of a larger computing device 350. A computing device 350 that may house the processor 220 therein may include, but are not limited to, laptops, desktops, workstations, personal digital assistants, servers 110, databases 115, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers 110, databases 115, mainframes, cellular telephones, tablet computers, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a smart watch may transfer data to a smartphone, wherein the smartphone may use that data in a manner separate from the smart watch.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
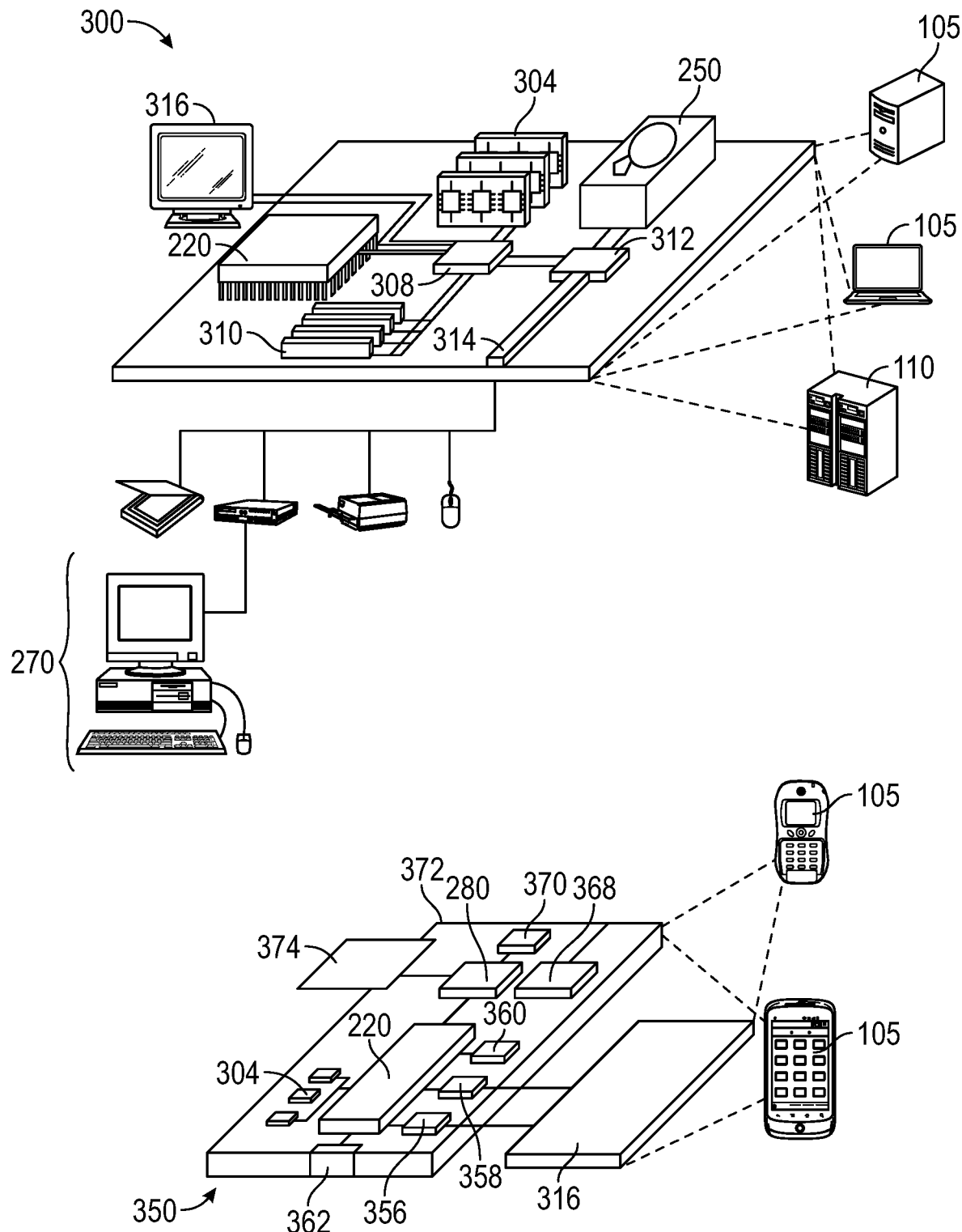
FIG. 3 is a diagram illustrating a system embodying features consistent with the principles of the present disclosure.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices 300 may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may comprise a power supply. The power supply may be any source of power that provides the system 400 with electricity. In one preferred embodiment, the system 400 may comprise a plurality of power supplies that may provide power to the system 400 in different circumstances. For instance, the system 400 may be directly plugged into a stationary power outlet, which may provide power to the system 400 so long as it remains in one place. The system 400 may also be connected to a battery so that the system 400 may receive power even when it is not connected to a stationary power outlet. In this way, the system 400 may always receive power so that it may continuously update geolocation data and provide users 405 with continuously updated conditions of the location of the smart plug 413.

Figure 4:
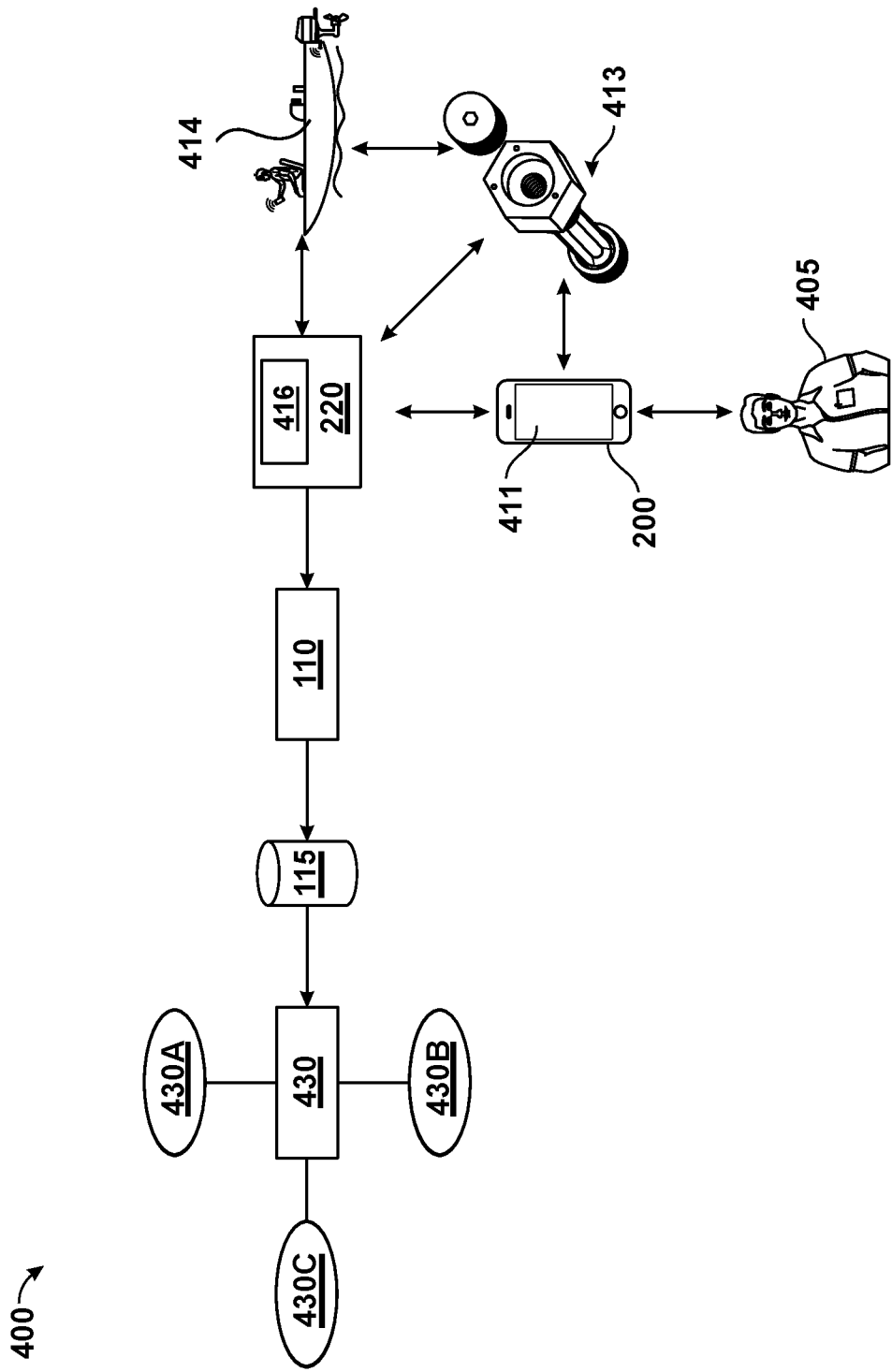
FIG. 4 is a diagram illustrating a system embodying features consistent with the principles of the present disclosure.
Figure 5:
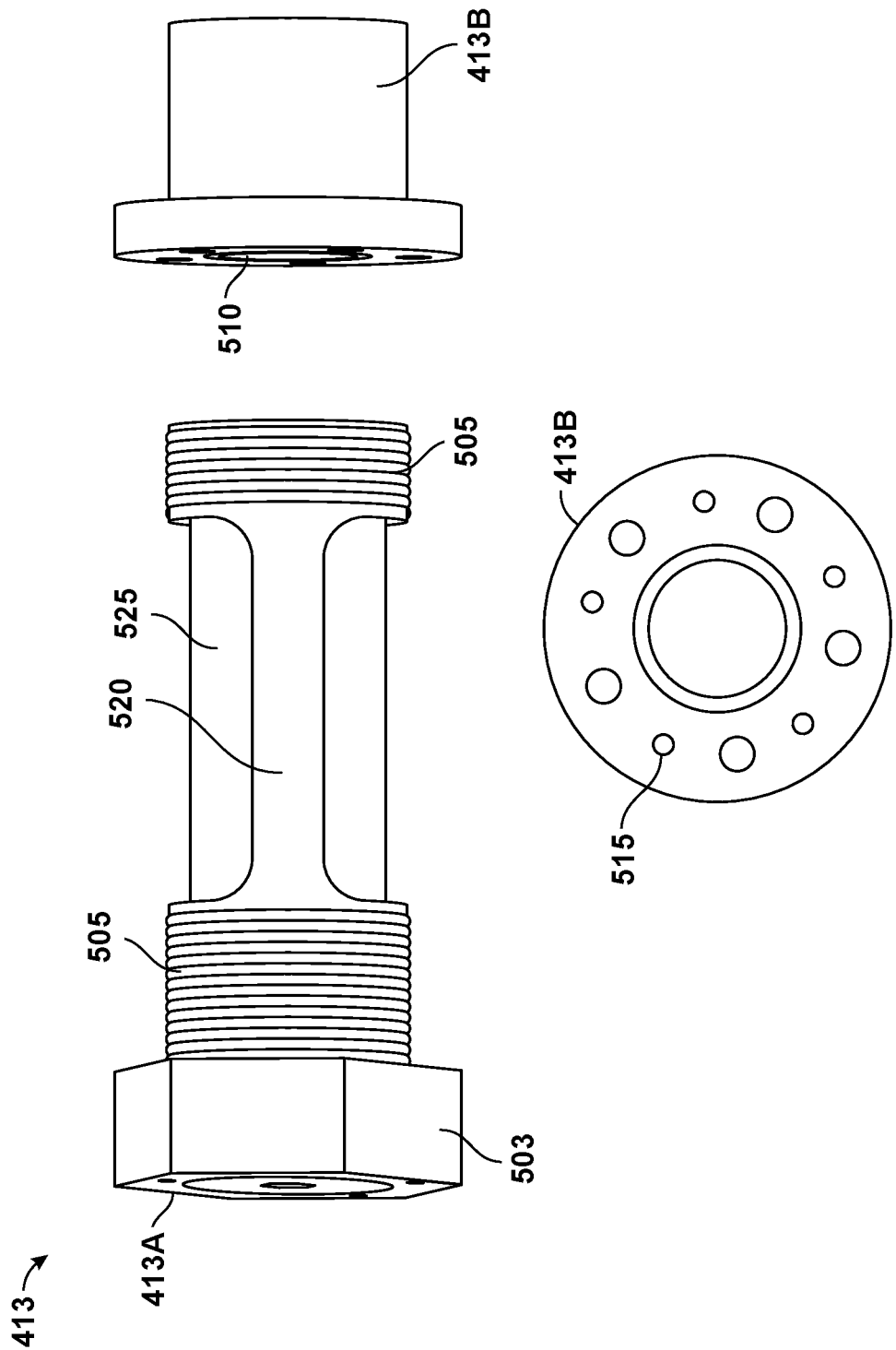
FIG. 5 is a diagram illustrating a system embodying features consistent with the principles of the present disclosure.
Figure 6:
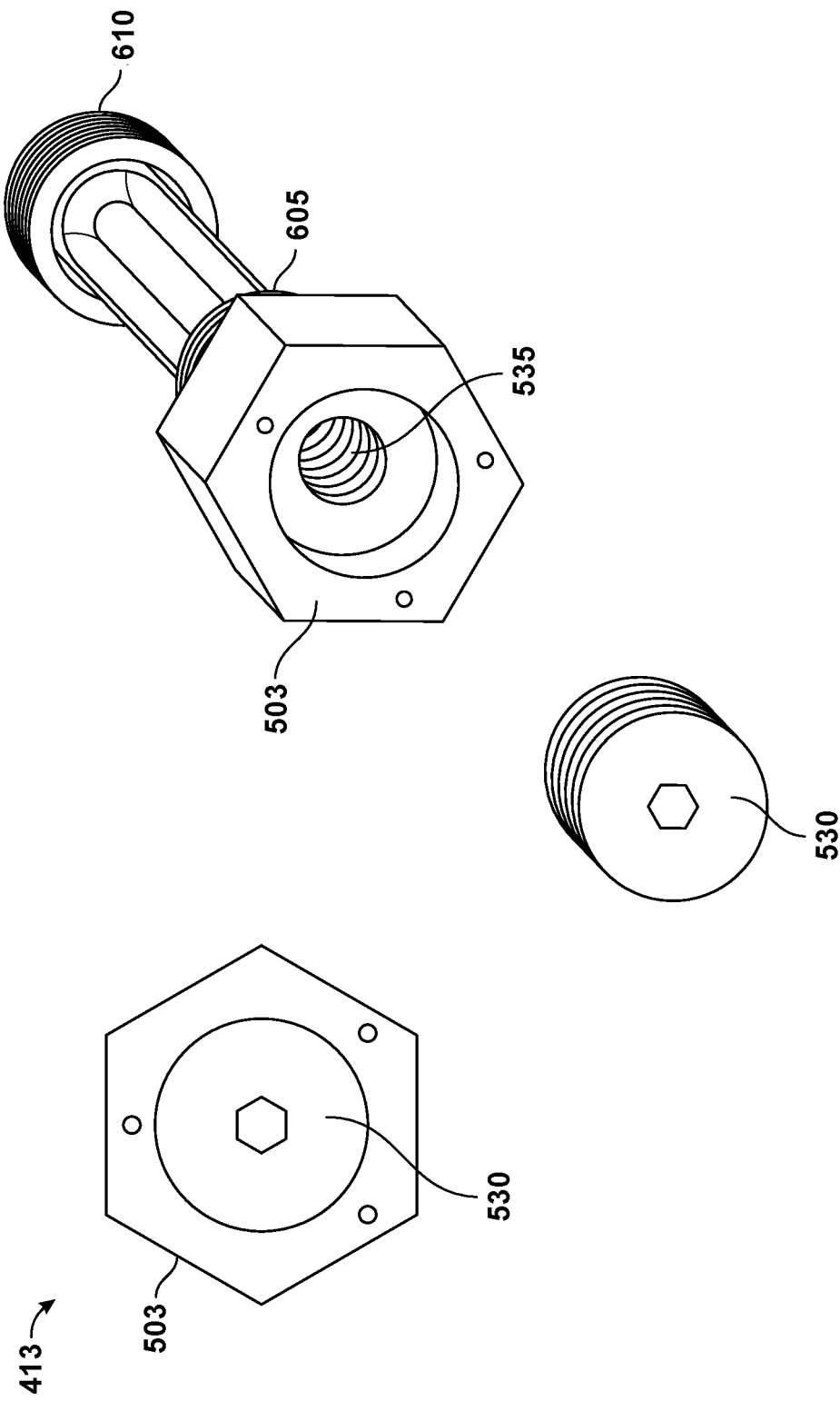
FIG. 6 is a diagram illustrating a system embodying features consistent with the principles of the present disclosure.
Figure 7:
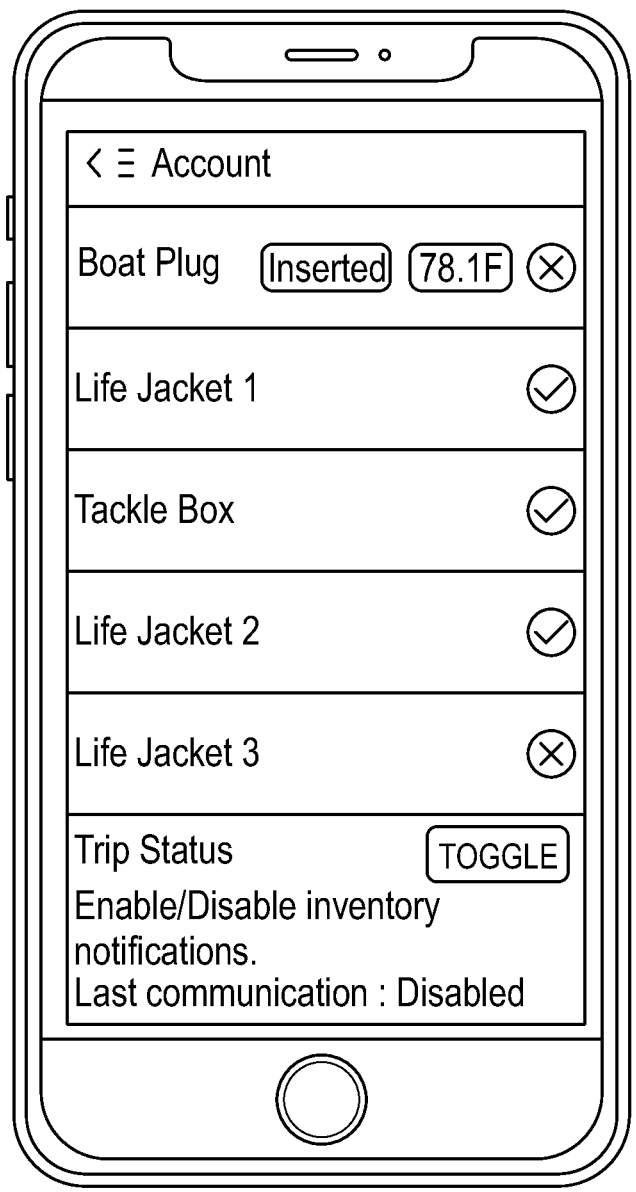
FIG. 7 is a diagram illustrating a system embodying features consistent with the principles of the present disclosure.
Figure 8:
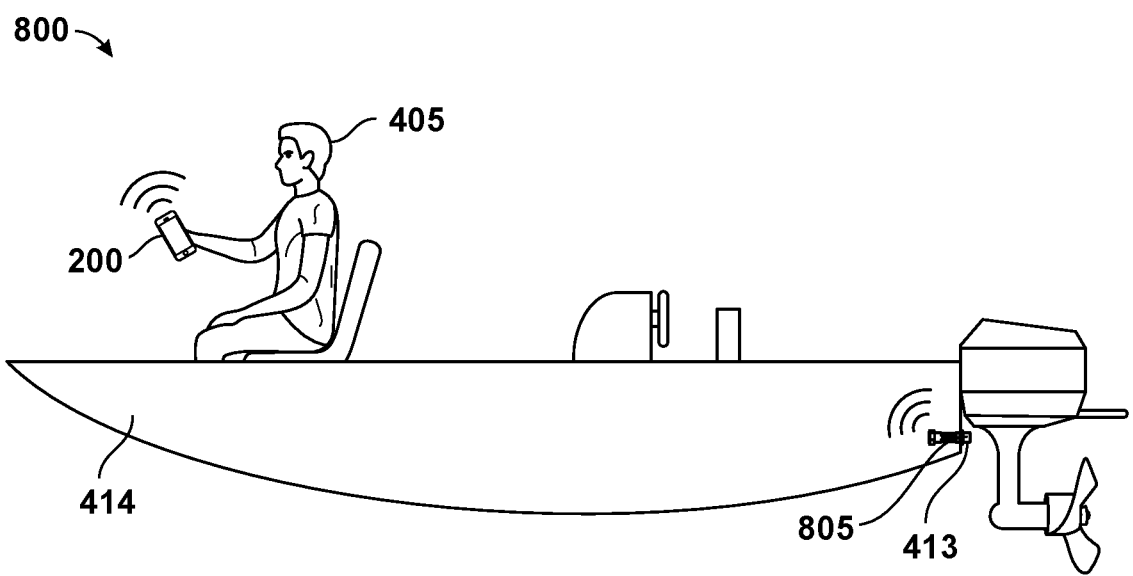
FIG. 8 is an environmental view of the system being used by a user within an environment.
Figure 9:
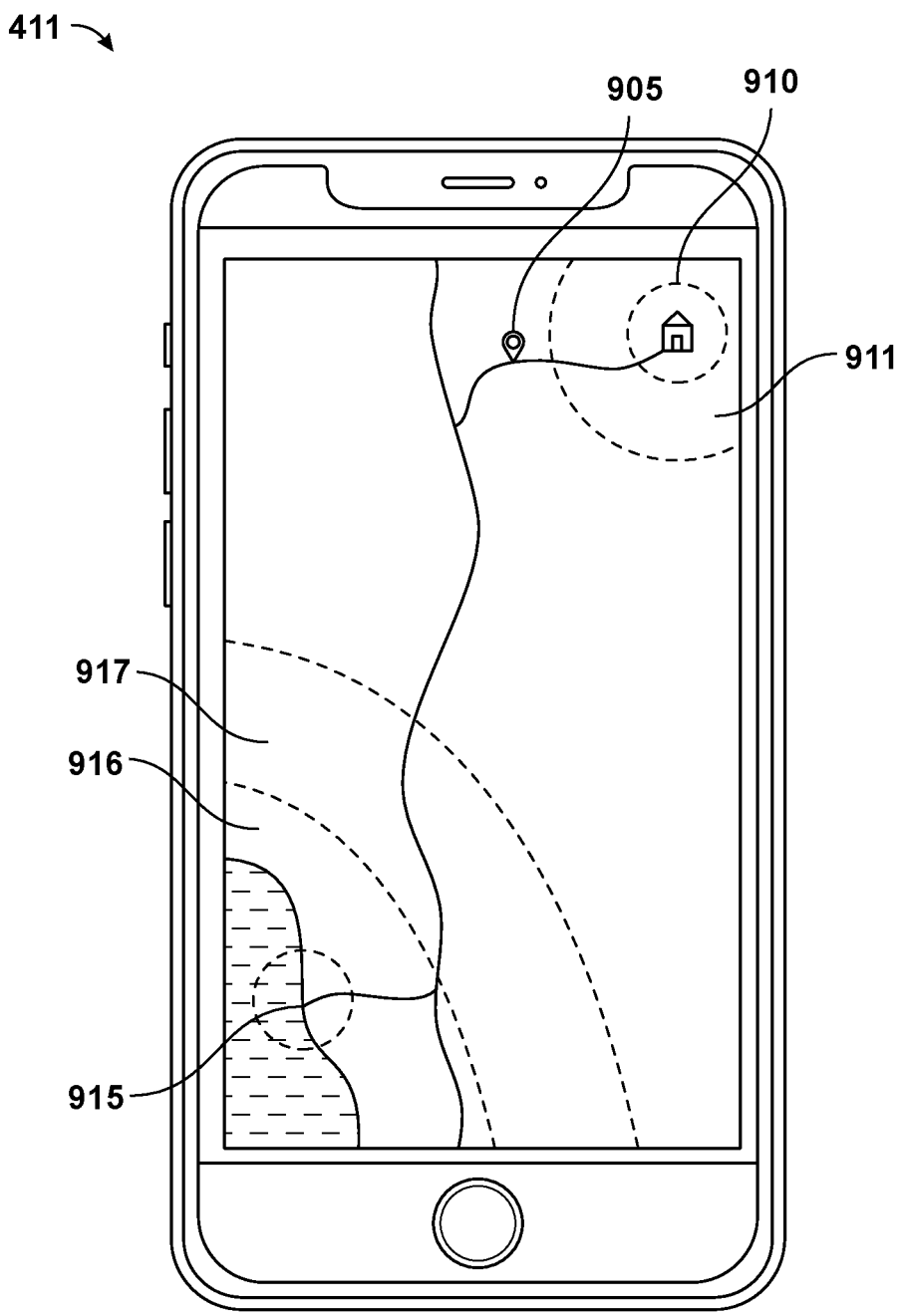
FIG. 9 is a diagram illustrating a system embodying features consistent with the principles of the present disclosure.
Figure 10:
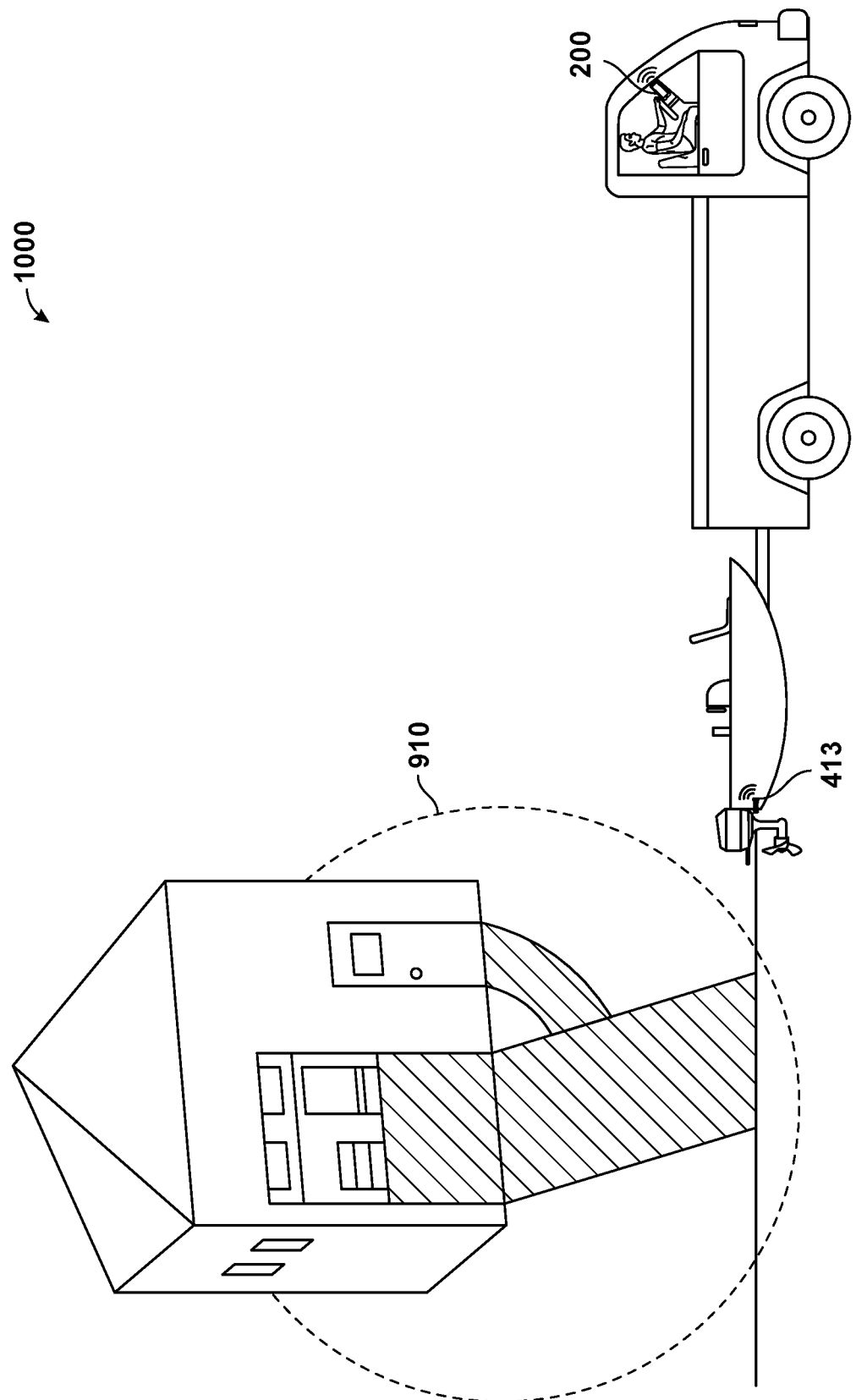
FIG. 10 is an environmental view of the system being used by a user within an environment.
Figure 11:
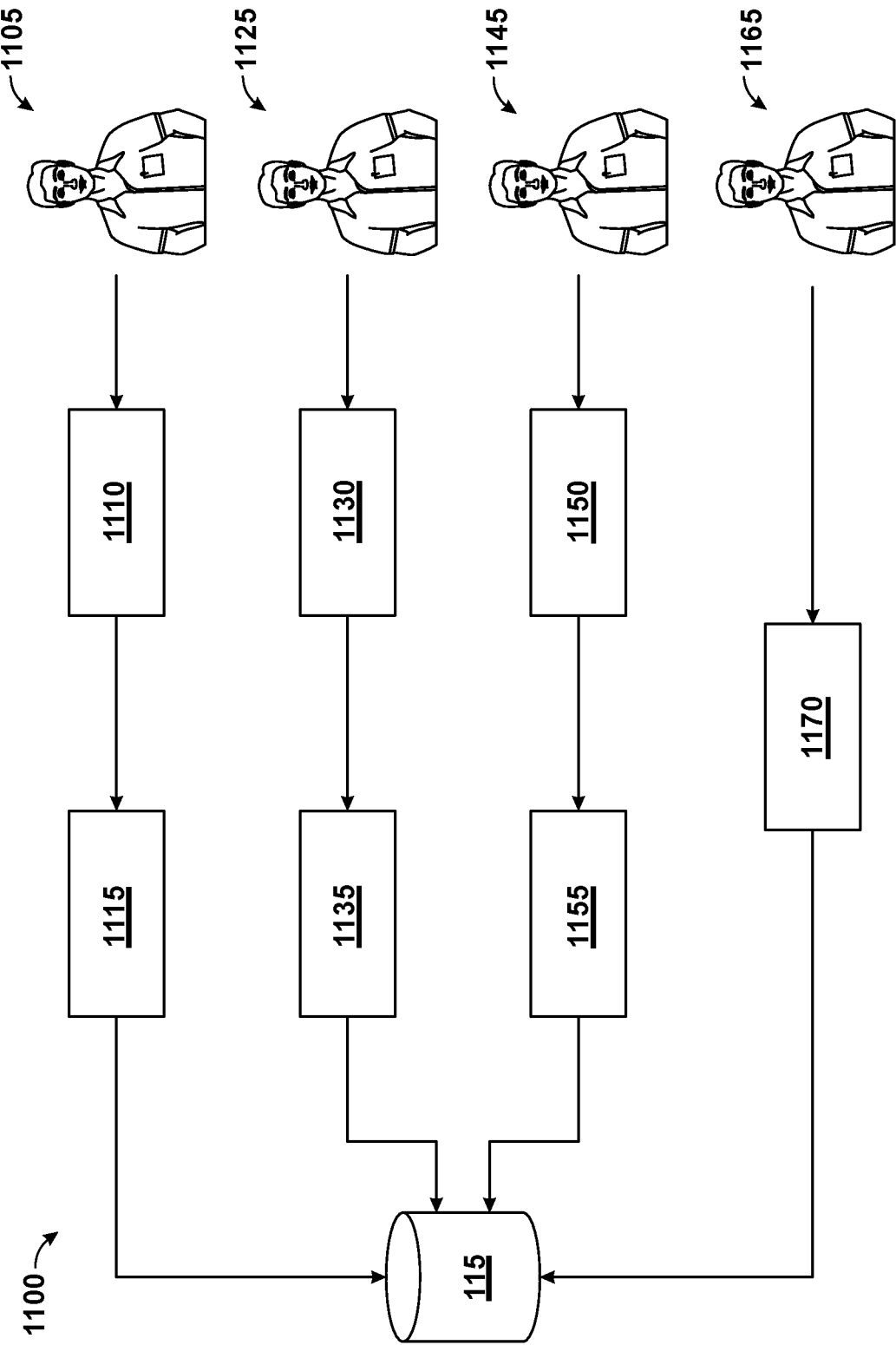
FIG. 11 is a diagram illustrating the manner in which individual access to data may be granted or limited based on user roles or administrator roles.
Figure 12:
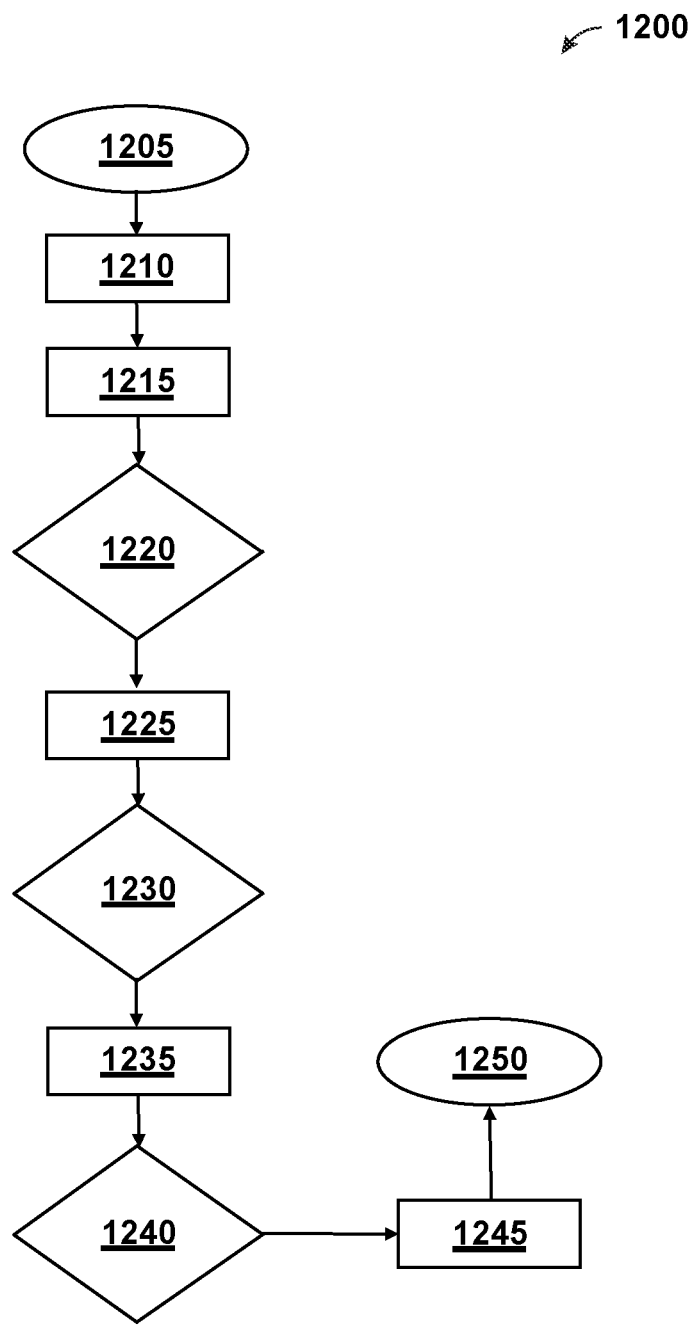
FIG. 12 is a flow chart illustrating certain method steps of a method embodying features consistent with the principles of the present disclosure.

A system 400 and methods for alerting a user 405 when a smart plug 413 is not properly positioned within a drain hole 805 is provided. FIGS. 4-12 illustrate preferred embodiments of said system 400 and methods. FIG. 4 illustrates a preferred embodiment of a system 400 designed to track the location of a smart plug 413. FIGS. 5 and 6 illustrate a preferred embodiment of the smart plug 413. FIG. 7 illustrates a user interface 411 of a computing entity 200 that may be used to alert a user 405 that a smart plug 413 has not been properly inserted into a drain hole 805 of a marine vehicle 414. FIG. 8 illustrates an environmental view of the system 400 being used within an environment 800 by a user 405 who has already placed the marine vehicle 414 having a smart plug 413 within a body of water. FIG. 9 illustrates a user interface 411 of a computing entity 200 that may be used by a user 405 to select geographic zones 430B that may be used by the system 400 to alert a user 405 to properly position the smart plug 413 within the drain hole 805 of a marine vehicle 414. FIG. 10 is an environmental view of the system 400 being used within an environment 1000, wherein the user 405 is leaving a designated geographic zone 430B. FIG. 11 illustrates permission levels that may be utilized by the system 400 for controlling access to user content 1115, 1135, 1155. FIG. 12 illustrates a method that may be carried out by the system 400 to warn the user 405 that the smart plug 413 has not been properly positioned within a drain hole 805 of a marine vehicle 414 prior to launch within a body of water. It is understood that various method steps associated with the methods of the present disclosure may be carried out as operations by the system 400 shown in FIG. 4.

As illustrated in FIG. 4, the system 400 of the present disclosure generally comprises a smart plug 413, a plug sensor, a processor 220 operably connected to the plug sensor, and a non-transitory computer-readable medium 416 coupled to the processor 220 and having instructions stored thereon. In some preferred embodiments, a computing entity 200 having a user interface 411 may be operably connected to the processor 220. In another preferred embodiment, a database 115 operably connected to the processor 220 may be used to store data of the system 400 therein. In yet another preferred embodiment, a server 110 may be operably connected to the database 115 and processor 220, facilitating the transfer of information between the processor 220 and database 115. The various components of the system 400 of the present disclosure may be operably connected to one another using a wired or wireless connection. Though the present application primarily describes the smart plug 413 used in the field of marine vehicles 414, one with skill in the art will understand that the smart plug 413 can be used in other fields without departing from the inventive subject matter herein. For instance, the smart plug 413 may be fitted to drain holes 805 of land-based vehicles, portable coolers, chemical reactors, etc. without departing from the subject matter described herein.

As mentioned previously, the system 400 is designed to detect the position of a smart plug 413 on a marine vehicle 414 and alert a user 405 and alert said user 405 of said position prior to and/or after said marine vehicle 414 is launched into a body of water. The smart plug 413 of the preferred embodiment is a boat plug comprising a casing, control board, at least one sensor, power supply, and plug transmitter. The casing is shaped to fit a drain hole 805 of the marine vehicle 414 such that said casing will fill said drain hole 805 in a way such that water is prevented from entering said marine vehicle 414 through said drain hole 805. As illustrated in FIGS. 5 and 6, the casing preferably comprises a male portion 413A and a female portion 413B, wherein said male portion 413A and said female portion 413B are configured to interlock with one another. The physical features of the female portion 413B preferably substantially conform to the physical features of the drain hole 805; however, some embodiments of a female portion 413B may have at least one physical feature that is smaller or larger than the physical features of the drain hole 805 without departing from the inventive subject matter herein. For instance, in some embodiments the body of an aperture section of the female portion 413B may have a diameter that is smaller than the diameter of the drain hole 805. The aperture section of the female portion 413B of said casing is preferably aligned such that it is aligned with the drain hole 805, allowing said male portion 413A of the casing to be secured to the female portion 413B via said aperture section of said female portion 413B and through said drain hole 805. Types of plug designs that may be used to ensure the male portion 413A creates a watertight seal within the aperture of the female portion 413B and drain hole 805 include, but are not limited to, tapered, compression, threaded with O-ring, or any combination thereof.

The male portion 413A preferably secures to the female portion 413B via an internal threaded section 510 about said aperture of said female portion 413B (not drawn to scale in FIG. 5) and/or said drain hole 805 and an external threaded section 505 of said male portion 413A, wherein said internal threaded section 510 and said external threaded section(s) 505 are configured mate when a rotational force is applied to the male portion 413A. The threaded sections are preferably parallel but may be tapered or a combination of tapered and parallel without departing from inventive subject matter herein. In a preferred embodiment, the external threads and internal threads allow an O-ring of said male portion 413A to be tightly secured between said female portion 413B and male portion 413A, preventing water from entering through said drain hole 805. A head 503 of the male portion 413A is preferably larger than the aperture of the female portion 413B so that the male portion 413A cannot be mated with the female portion 413B and/or said drain hole 805 any further than said head 503. The O-ring is preferably located against a bottom surface of said head 503. In one preferred embodiment, as illustrated in FIG. 6, the male portion 413A may comprise of a first threaded section 605 and a second threaded section 610. The second threaded section 610 is preferably located on a column 520 of the male portion 413A and configured to mate with the internal threaded section 510 in the manner described above. In one preferred embodiment of a casing having a first threaded section 605 and second threaded section 610, a non-threaded section of the column 520 between said first threaded section 605 and said second threaded section 610 comprises a diameter smaller than the aperture and drain hole 805 and a length longer than the depth of said drain hole 805, allowing said male portion 413A to be secured to said marine vehicle 414 by way of said drain hole 805 when said second threaded section 610 is rotated past the internal threaded section 510 of said female portion 413B and/or said drain hole 805. Supports 525 located to the sides of the column 520 may provide additional structural integrity to the male portion 413A.

The column 520 preferably comprises a cavity 535 configured to contain the control board, plug transmitter, and power supply therein. The cavity 535 may be accessed via an entry panel 530 of the male portion 413A, which is preferably located on the head 503, as illustrated in FIG. 6, and threaded so that it may be securely attached to said head 503. In one preferred embodiment, the head 503 may contain a cavity 535 configured to accept said power supply. A circuit may transfer power from the power supply located in the head 503 to the control board, at least one sensor, and plug transmitter of the smart plug 413. The control board is configured to control the various features of the smart plug 413. The at least one sensor of the smart plug 413 is configured to capture environmental data 430A that may be used by the system 400 to determine the position of the smart plug 413 and/or determine when the marine vehicle 414 has entered the water. The plug transmitter is configured to broadcast a computer readable signal containing geospatial data, environmental data 430A, and/or position of the smart plug 413 on said marine vehicle 414. In other preferred embodiments, the transmitter may be configured to send a computer readable signal containing instructions, directing a user's computing entity 200 to perform an action that may alert said user 405 to an issue with the position of the smart plug 413.

In a preferred embodiment, at least one magnet 515 of said female portion 413B and at least one magnetic field sensor of said male portion 413A may be used by the system 400 to determine when the smart plug 413 is correctly position within the drain hole 805 to prevent water from entering the marine vehicle 414 via said drain hole 805. For instance, an exterior section of said female portion 413B containing a plurality of magnets 515 may emit a magnetic field in a way such that a magnetic field sensor positioned within said cavity 535 of said male portion 413A may detect said magnetic field when and only when the bottom surface and O-ring of said head 503 is flush with said exterior section of said female portion 413B. The environmental data 430A obtained by said magnetic field sensor may allow the control board to determine that the smart plug 413 is correctly positioned within the drain hole 805. Alternatively, the control board may send the environmental data 430A to the processor 220, allowing the processor 220, server 110, or user's computing entity 200 to make the determination that the smart plug 413 is correctly positioned within the drain hole 805. The system 400 may use other types of sensors and environmental data 430A to determine when a smart plug 413 is correctly positioned within a drain hole 805. For instance, environmental data 430A collected by a light sensor positioned on the bottom surface of the head 503 may be used by the system 400 to determine if said smart plug 413 is correctly positioned within said drain hole 805. If no light is detected by the sensor, the system 400 may determine that the smart plug 413 is correctly positioned within the drain hole 805. Alternatively, if light is detected, the system 400 may determine that the smart plug 413 is not correctly positioned within the drain hole 805, and a gap may exist between said bottom surface of said head 503 and said external section of said female portion 413B.

The control board preferably comprises at least one circuit and microchip. In another preferred embodiment, the control board may further comprise a global positioning system (GPS), which may allow the control board to transmit geospatial data in addition to environmental data 430A and/or the position of said smart plug 413. For instance, the control board of a smart plug 413 comprising a GPS sensor may collect and transmit geospatial data to the system 400, which may allow the system 400 to alert a user 405 when said smart plug 413 and at least one of the user's computing entity 200 and marine vehicle 414 are outside a designated distance from one another. This feature can be used to prevent a user 405 from leaving the smart plug 413 in an unwanted location after removal of the smart plug 413 from the marine vehicle 414. The control board may also regulate the transfer of power to the various components of the smart plug 413. The microchip of the control board comprises a microprocessor and memory. Some preferred embodiments of the microprocessor may further comprise an antenna, which in some embodiments may act as the plug transmitter. The microprocessor may be defined as a multipurpose, clock driven, register based, digital-integrated circuit which accepts binary data as input, processes it according to instructions stored in its memory, and provides results as output. In a preferred embodiment, the microprocessor of the control board may receive a signal from the processor 220 of the system 400 that may cause the control board to activate the at least one sensor. For instance, a computing entity 200 may send a computer readable signal to the antenna of said control board when a graphic information system (GIS) of the computing entity 200 determines that the user 405 is within a designated distance of said smart plug 413.

Memory may be defined as a device capable of storing information permanently or temporarily in digital form. In the preferred embodiment, memory of the microchip stores environmental data 430A, thresholds, and/or instructions that allow it to determine whether the smart plug 413 is in an optimal position on a marine vehicle 414. In some preferred embodiments, memory may include one or more volatile memory units. In another preferred embodiment, memory may include one or more non-volatile memory units. A memory device may refer to storage space within a single storage device or spread across multiple storage devices. Types of devices that may act as memory may include, but are not limited to, read only memory (ROM), random access memory (RAM), and flash memory. ROM may comprise a conventional ROM device or another type of static storage device that stores static information and instructions for execution by the microprocessor. RAM may comprise a conventional RAM device or another type of dynamic storage device that stores information and instructions for execution by the microprocessor.

As mentioned previously, the at least one sensor is configured to capture environmental data 430A pertaining to the environmental conditions to which the smart plug 413 is exposed. Types of sensors that may act as the at least one sensor include, but are not limited to, a microphone, thermometer, magnetic field sensor, liquid detection sensor, passive infrared sensor, light sensor, GPS sensor, barometer, gyroscope, accelerometer, and camera, or any combination thereof. Therefore, the at least one sensor may be used to measure a variety of environmental data 430A pertaining to environmental conditions and transmit said environmental data 430A to the control board. In some preferred embodiments, the control board may process the environmental data 430A to determine the position of the smart plug 413 or transmit the environmental data 430A to the processor 220 of the system 400 to do the same. Types of devices that may act as the plug transmitter include, but are not limited, to near field communication (NFC), Bluetooth, infrared (IR), radio-frequency communication (RFC), radio-frequency identification (RFID), and ANT+, or any combination thereof. In one preferred embodiment, plug transmitters may broadcast signals of more than one type. For instance, a plug transmitter comprising an IR transmitter and Bluetooth may broadcast IR signals and Bluetooth signals. Alternatively, a plug transmitter may broadcast signals of only one type of signal. For instance, the smart plug 413 may be fitted with a plug transmitter that broadcast only RFC signals.

The plug sensor is configured to detect the signals broadcast by the plug transmitter of the smart plug 413 and is operably connected to the processor 220. In a preferred embodiment, the plug sensor may be configured to detect a number of signal types that may be emitted by an plug transmitter, including, but not limited to, NFC, Bluetooth, IR, RFC, RFID, and ANT+, or any combination thereof. For instance, a plug sensor may be configured to detect Bluetooth, NFC, and IR signals broadcast by one or more plug transmitters. Alternatively, the plug sensor may be configured to detect only one signal type emitted by a plug transmitter. For instance, a computing entity 200 having a plug sensor may be configured to only detect Bluetooth signals. Another preferred embodiment, the plug sensor is component of a larger computing entity 200. A computing entity 200 that may house the plug sensor therein may include, but are not limited to, laptops, desktops, workstations, personal digital assistants, servers 110, mainframes, cellular telephones, tablet computers, or any other similar device.

In a preferred embodiment, the programming instructions responsible for the operations carried out by the processor 220 are stored on a computer-readable medium ("CRM"), which may be coupled to the server 110, as shown in FIG. 4. In a preferred embodiment, the CRM is a non-transitory computer-readable medium 416. Alternatively, the programming instructions may be stored or included within the processor 220. Examples of non-transitory computer-readable mediums 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 416. The software instructions may be read into memory from another non-transitory computer-readable medium 416 or from another device. Alternatively, hard-wired circuitry may be used in place of or in combination with software instructions to implement processes consistent with the principles of the invention. Thus, implementations consistent with the principles of the invention are not limited to any specific combination of hardware circuitry and software.

In an embodiment, the system 400 may further comprise a computing entity 200 operably connected to the processor 220. A computing entity 200 may be implemented in a number of different forms, including, but not limited to, servers 110, multipurpose computers, mobile computers, etc. For instance, a computing entity 200 may be implemented in a multipurpose computer that acts as a personal computer for a user 405, such as a laptop computer. For instance, components from a computing entity 200 may be combined in a way such that a mobile computing device 350 is created, such as mobile phone. Additionally, a computing entity 200 may be made up of a single computer or multiple computers working together over a network. For instance, a computing entity 200 may be implemented as a single server 110 or as a group of servers 110 working together over and Local Area Network (LAN), such as a rack server system. Computing entities 200 may communicate via a wired or wireless connection. For instance, wireless communication may occur using a Bluetooth, Wi-Fi, or other such wireless communication device.

In a preferred embodiment, as illustrated in FIG. 4, the computing entity 200 is a mobile computing device 350. Mobile computing devices 350 may include, but are not limited to, cellular telephones, smart phones, personal digital assistants, tablet computers, or other similar mobile computing devices. In an embodiment, computing entities 200 may communicate audibly, meaning computing entities 200 may transmit and receive information via sound waves and covert the sound waves into digital information. For instance, a user 405 may instruct a user interface 411 of a computing entity 200 with their voice to perform a certain action. The processor 220 may convert the sound waves of the user 405 into instructions, which the processor 220 may then carry out. Computing entities 200 may likewise generate audible sound for a user 405, such as through an audio device. Such sound may include sound from voice telephone calls, recorded notes, voice messages, music files, etc. Audible sounds may also include sound generated by applications operating on a computing entity 200. For instance, an application running on a mobile computing device 350 may be configured in a way such that an alarming sound is emitted via an output device operably connected to the computing entity 200 when the marine vehicle 414 is launched into water without the male portion 413A of the smart plug 413 first being secured within the drain hole 805. For instance, the processor 220 may receive a signal indicating that the distance between the smart plug 413 and marine vehicle 414 has gone outside of an upper limit. The processor 220 may then convert this signal into an audio message that may be sent to an output device to make the user 405 aware that they may have accidentally left the smart plug 413 at home.

As previously mentioned, a user interface 411 of the computing entity 200 operably connected to the processor 220 may be used to control the various functions of the system 400 and view the status of the position of the smart plug 413, as illustrated in FIG. 7. A user interface 411 may be defined as a space where interactions between a user 405 and the system 400 may take place. In an embodiment, the interactions may take place in a way such that a user 405 may control the operations of the system 400. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the system 400 to the user 405 via a display operably connected to the processor 220. A display may be defined as an output device that communicates data that may include, but is not limited to, visual, auditory, cutaneous, kinesthetic, olfactory, and gustatory, or any combination thereof.

Information presented via a display may be referred to as a soft copy of the information because the information exists electronically and is presented for a temporary period of time. Information stored on the non-transitory computer-readable medium 416 may be referred to as the hard copy of the information. For instance, a display may present a soft copy of visual information via a liquid crystal display (LCD), wherein the hardcopy of the visual information is stored on a local hard drive. For instance, a display may present a soft copy of audio information via a speaker, wherein the hard copy of the audio information is stored on a flash drive. For instance, a display may present a soft copy of tactile information via a haptic suit, wherein the hard copy of the tactile information is stored within a database 115. Displays may include, but are not limited to, cathode ray tube monitors, LCD monitors, light emitting diode (LED) monitors, gas plasma monitors, screen readers, speech synthesizers, haptic suits, speakers, and scent generating devices, or any combination thereof.

The geolocation data used by the system 400 to perform the various functions is preferably obtained via a geolocation device. The geolocation may be a single component or a component of a larger computing entity 200. In one preferred embodiment, the geolocation may comprise a plurality of devices working together to obtain a geolocation via triangulation. In a preferred embodiment, the geolocation device is a GPS sensor. The GPS sensor may measure and transmit geospatial data relevant for determining geolocation. A GPS sensor may be defined as a receiver having an antenna designed to communicate with a navigation satellite system. Geospatial data may be spatial data including, but not limited to, numeric data, vector data, and raster data, or any combination thereof. Numeric data may be statistical data which includes a geographical component or field that can be joined with vector files so the data may be queried and displayed as a layer on a map in a GIS. Vector data may be data that has a spatial component, or X, Y coordinates assigned to it. Vector data may contain sets of points, lines, or polygons that are referenced in a geographic space. Raster data may be data in a .JPG, .TIF, .GIF or other picture file format. For instance, a map scanned in a flatbed scanner may be considered raster data.

In one preferred embodiment, as illustrated inf FIG. 9, geospatial data may be presented to the user 405 via a GIS of the user interface 411 and allow a user 405 to select a plurality of geographic zones 430B. For instance, a user 405 may be able to view their current geolocation 905, primary home zone 910, and primary launch zone 915 via a GIS of the user interface 411, wherein the current geolocation 905 is the location of at least one of the smart plug 413 and user's computing entity 200, wherein the primary home zone 910 is a geographic zone 430B in which the user's marine vehicle 414 is stored, wherein the primary launch zone 915 is a geographic zone 430B in which the user's marine vehicle 414 will be launched into a body of water. In some preferred embodiments, a user 405 may create multiple geographic zones 430B that may cause the system 400 to alert the user 405 to correctly position the smart plug 413 within the drain hole 805 of the marine vehicle 414. In a preferred embodiment, the system 400 may use different indicia to represent the level of attention needed by said user 405. For instance, as illustrated in FIG. 9, the user 405 may create a primary launch zone 915, second launch zone 916, and third launch zone 917. Instructions of the system 400 may cause the processor 220 to perform a different function when the system 400 determines that the user's current geolocation 905 has entered one of the launch zones. For instance, the processor 220 may be instructed to send a text message to the user's computing entity 200 when entering the third launch zone 917, wherein said text message instructs the user 405 to correctly position the smart plug 413 prior to launching the marine vehicle 414 in a body of water. The processor 220 may be instructed to send a notification to the user's computing entity 200 and cause the user's computing entity 200 to vibrate when entering the second launch zone 916, wherein said notification informs the user 405 of how far they are from the primary launch zone 915. The processor 220 may be instructed to send a notification to the user's computing entity 200 and cause the user's computing entity 200 to sound an alert when entering the primary launch zone 915, wherein said notification and sounded alert are used to warn the user 405 that they are at the launch location and should insert the smart plug 413 into the drain hole 805.

In another preferred embodiment, the user 405 may create a plurality of home zones within the user interface 411. For instance, as illustrated in FIG. 9, the user 405 may create a primary home zone 910 and second home zone 911. Instructions of the system 400 may cause the processor 220 to perform a different function when the current location leaves one of the home zones. For instance, the processor 220 may be instructed to send a text message to the user's computing entity 200 when the smart plug 413 leaves the primary home zone 910, wherein said text message instructs the user 405 as to the location of the smart plug 413. The processor 220 may be instructed to send a computer readable signal to emergency personnel when the smart plug 413 leaves the second home zone 911, wherein said computer readable signal contains information pertaining to the marine vehicle 414 and its geolocation. In another preferred embodiment, the system 400 may be configured to alert the user 405 when it is determined that the marine vehicle 414 and smart plug 413 are in different geographic zones 430B. For instance, the processor 220 may be instructed to send a computer readable signal to the user's computing entity 200 when the system 400 determines that the marine vehicle 414 is in the second home zone 911 and the smart plug 413 is in the primary launch zone 915, wherein said computer readable signal contains information instructing the user 405 as to the location of the smart plug 413. In yet another preferred embodiment, the system 400 may cancel instructions pertaining to a geographic zone 430B should the user's computing entity 200 be within a certain distance of the smart plug 413. For instance, should a user's current geolocation 905 match the geolocation of the smart plug 413, instructions of the system 400 may disable the function that causes the processor 220 to send a computer readable signal alerting the user 405 via SMS message that the smart plug 413 has left the primary home zone 910, as illustrated in FIG. 10. For instance, should a user 405 be within a certain specified distance of said marine vehicle 414, instructions of the system 400 may disable the function that causes the processor 220 to send a computer readable signal alerting emergency personnel of the marine vehicle's 414 current geolocation.

In a preferred embodiment, the user 405 may manually or automatically create geographic zones 430B within their computing entity 200. For instance, a user 405 may choose via the user interface 411 to cause their current geolocation to be set as the primary home zone, wherein the radius threshold limit 430C of the primary home zone 910 is automatically generated by the processor 220. In a preferred embodiment, geographic zones 430B are circular in shape; however, a geographic shape may comprise other forms without departing from the inventive subject matter herein. Zone parameters may be used to define the bounds of a geographic zone 430B. For instance, a user 405 may define a certain geographic point in the GIS as a central point for a geographic zone 430B and define a radius of the geographic zone 430B to control the size of said geographic zone 430B. Some preferred embodiments of a geographic zone 430B may have multiple zone parameters. For instance, a geographic zone 430B may have a first radius and second radius, wherein the geographic zone 430B defined by said first radius and second radius lies between the circumference of the circles created by said first radius and second radius. In a preferred embodiment, the user 405 may manipulate a user interface 411 of the computing entity 200 to update zone parameters of the system 400, as illustrated in FIG. 9.

In another preferred embodiment, a user 405 may manually or automatically set threshold limits 430C of the system 400. Threshold limits 430C may be used to define the maximum and/or minimum measurement of environmental data 430A allowed before the system 400 determines whether the smart plug 413 has been properly inserted into said drain hole 805. For instance, the system 400 may send a computer readable signal to the computing entity 200 in order to cause said computing entity 200 to display a warning indicia when the at least one sensor of the smart plug 413 detects water. For instance, the system 400 may send a computer readable signal to the computing entity 200 in order to cause an output device operably connected to said computing entity 200 to sound an alert when it is determined that the smart plug 413 is at a distance further than a maximum allowable distance as set by the user 405 via the user interface 411. In another preferred embodiment, a user 405 having sufficient permission levels may choose to have the system 400 automatically assign threshold limits 430C, which the system 400 may then use to alert a user 405 when said current geolocation is outside a certain geographic zone 430B and/or when environmental data 430A is outside of a threshold limit 430C.

In one preferred embodiment, a user 405 may select a setting within the user interface 411 that causes the system 400 to automatically assign threshold limits 430C that are more sensitive to environmental conditions. For instance, a user 405 may select a "highly sensitive" option within the user interface 411, which will cause the system 400 to automatically generate threshold limits 430C for magnetic field data that can only be passed should the bottom surface of the head 503 of the male portion 413A containing the magnetic field sensor be firmly secured against the exterior section of the female portion 413B containing the at least one magnet 515. In some preferred embodiments, there may be a plurality of threshold limits 430C for a single environmental data 430A category, wherein each threshold limit 430C of the plurality of threshold limits 430C represents a different level of attention needed to address the cause of the environmental data 430A being outside of said threshold limits 430C. For instance, as illustrated in FIG. 8, a first magnetic field threshold limit 430C and second magnetic field threshold limit 430C may be used to alert the user 405 that the smart plug 413 may beginning to loosen and is too loose, respectively, allowing the user 405 to adjust the smart plug 413 should an issue begin to arise.

In a preferred embodiment, the environmental data 430A, geographic zones 430B, and threshold limits 430C may be saved within a user profile 430. The user profile 430 may be saved to the non-transitory computer-readable medium 416. Alternatively, the user profile 430 may be saved to a database 115. As used herein, a database 115 refers to a set of related data and the way it is organized. Access to this data is usually provided by a database 115 management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

As shown in FIG. 4, the database 115 may be configured to store data of the system 400 therein. The processor 220 may be operably connected to the database 115 via wired or wireless connection. In a preferred embodiment, environmental data 430A, geographic zones 430B, and threshold limits 430C may be stored within a user profile 430. The database 115 may be configured to store a plurality of user profiles 430 therein and the various information, data, and/or content tied to or associated with such profiles. The database 115 may be a relational database 115 such that the environmental data 430A, geographic zones 430B, and threshold limits 430C within a user profile 430 within the plurality user profiles 430 may be stored, at least in part, in one or more tables. Alternatively, the database 115 may be an object database 115 such that the environmental data 430A, geographic zones 430B, and threshold limits 430C within a user profile 430 within the plurality of user profiles 430 may be stored, at least in part, as objects. In some instances, the database 115 may comprise a relational and/or object database 115 and a server 110 dedicated solely to managing the content assigned to user profiles 430 in the manner disclosed herein. Although the database 115 is represented as a single entity within FIG. 4, it is understood that data, information, and/or content stored within the database 115 or repository, as disclosed herein, may be stored within a plurality of databases 115 without departing from the inventive subject matter disclosed herein.

As illustrated in FIG. 11, the system 400 may also comprise a plurality of permission levels 1100 that may allow a user 405 to limit what data within their user profiles 430 they share with another user 405. This data may be collectively known as content 1115, 1135, 1155. To access the content 1115, 1135, 1155 stored within the database 115, users 405 may be required to make a request via the user interface 411. Access to the content 1115, 1135, 1155 within the database 115 may be granted or denied by the processor 220 based on verification of a requesting user's 1105, 1125, 1145 permission level 1100. If the requesting user's 1105, 1125, 1145 permission level 1100 is sufficient, the processor 220 may provide the requesting user 1105, 1125, 1145 access to content 1115, 1135, 1155 stored within the database 115. Conversely, if the requesting user's 1105, 1125, 1145 permission level 1100 is insufficient, the processor 220 may deny the requesting user 1105, 1125, 1145 access to content 1115, 1135, 1155 stored within the database 115. In an embodiment, permission levels 1100 may be based on user roles 1110, 1130, 1150 and administrator roles 1170, as shown in FIG. 11. User roles 1110, 1130, 1150 allow requesting users 1105, 1125, 1145 to access content 1115, 1135, 1155 that a user 405 has uploaded and/or otherwise obtained through use of the system 400. User roles 1110, 1130, 1150 allow users (or requesting users 1105, 1125, 1145 authorized by the user 405) to access the data tied to their own user profiles 430 within the database 115. Administrator roles 1170 allow administrators 1165 to access system wide data.

In an embodiment, user roles 1110, 1130, 1150 may be assigned to a user 405 in a way such that a requesting user 1105, 1125, 1145 may view user profiles 430 containing environmental data 430A, geographic zones 430B, and threshold limits 430C via a user interface 411. To access the data within the database 115, a user 405 may make a user request via the user interface 411 to the processor 220. In an embodiment, the processor 220 may grant or deny the request based on the permission level 1100 associated with the requesting user 1105, 1125, 1145. Only users 405 having appropriate user roles 1110, 1130, 1150 or administrator roles 1170 may access the data within the user profiles 430. For instance, as illustrated in FIG. 11, requesting user 1 1105 has permission to view user 1 content 1115 and user 2 content 1135 whereas requesting user 2 1125 only has permission to view user 2 content 1135. Alternatively, user content 1115, 1135, 1155 may be restricted in a way such that a user 405 may only view a limited amount of user content 1115, 1135, 1155. For instance, requesting user 3 1145 may be granted a permission level 1100 that only allows them to view user 3 content 1155 related to the length of wildlife/marine life captured but not user 3 content 1155 related to the geolocations in which said wildlife/marine life was captured. In the example illustrated in FIG. 11, an administrator 1165 may bestow a new permission level 1100 on users 405 so that it may grant them greater permissions or lesser permissions. For instance, an administrator 1165 may bestow a greater permission level 1100 on other users 405 so that they may view user 3's content 1155 and/or any other user's content 1115, 1135, 1155. Therefore, the permission levels 1100 of the system 400 may be assigned to users 405 in various ways without departing from the inventive subject matter described herein.

FIG. 12 provides a flow chart 1200 illustrating certain, preferred method steps that may be used to carry out the method for checking the position of a smart plug 413 and alerting a user 405 when said smart plug 413 is not positioned correctly in said drain hole 805. Step 1205 indicates the beginning of the method. During step 1210, the processor 220 may receive environmental data 430A and geospatial data from said smart plug 413. The processor 220 may then perform a query to determine if at least one geographic zone 430B has been specified by the user 405 during step 1215. In a preferred embodiment, the geographic zone 430B is a launch zone. Based on the results of the query, the processor 220 may perform an action during step 1220. If the processor 220 determines that at least geographic zone 430B has not been specified, the method may proceed to terminate method step 1250. If the processor 220 determines that at least one geographic zone 430B has been specified, the processor 220 may proceed to step 1225.

During step 1225, the processor 220 may perform a query to determine if the geospatial data of the smart plug 413 is encompassed within the at least one geographic zone 430B having a plurality of geospatial points. Based on the results of the query, the processor 220 may perform an action during step 1230. If the processor 220 determines that the geospatial data of the smart plug 413 does not match a geospatial point of said plurality of geospatial points of said at least one geographic zone 430B, the processor 220 may return to step 1225. If the processor 220 determines that the geospatial data of the smart plug 413 matches a geospatial point of said plurality of geospatial points of said at least one geographic zone 430B, the processor 220 may perform a query to determine if said environmental data 430A is outside of a threshold limit 430C during step 1235. Based on the results of the query, the processor 220 may perform an action during step 1240. If the processor 220 determines that the environmental data 430A is not outside of a threshold limit 430C, the processor 220 may proceed to the terminate method step 1250. If the processor 220 determines that that the environmental data 430A is outside of a threshold limit 430C, the processor 220 may execute instructions assigned to the geographic zone 430B during step 1245, wherein said instruction may cause said processor 220 to send a computer readable signal to a computing entity 200 of said user 405, causing said computing entity 200 to perform an action that may alert said user 405 that said smart plug 413 has not been positioned correctly within said drain hole 805. Once the processor 220 has executed the instructions assigned to the geographic zone 430B, the method may proceed to the terminate method step 1250.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one input/output device.

These computer programs, which may also be referred to as programs, software, software applications, applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter may be made without departing from the principles and scope of the inventive subject matter.

What is claimed is:

1. A system for tracking a position of a smart plug on a marine vehicle comprising,
a smart plug having a casing, control board, first geolocation device, and at least one plug transmitter,
wherein said control board is contained within a cavity of said casing,
wherein said first geolocation device is configured to collect geospatial data pertaining to a geolocation of said smart plug,
a marine vehicle having a second geolocation device,
wherein said second geolocation device is configured to collect geospatial data pertaining to a geolocation of said marine vehicle,
a processor operably connected to said smart plug, and
a non-transitory computer-readable medium coupled to said processor and having instructions stored thereon, which, when executed by said processor, cause said processor to perform operations comprising:
receiving said geospatial data from said first geolocation device,
receiving said geospatial data from said second geolocation device,
accessing a user profile of a user based on input of said user,
obtaining a geographic zone from said user profile,
determining when said smart plug and said marine vehicle are outside a designated distance using said geospatial data of said first geolocation device and said second geolocation device,
wherein said designated distance is a maximum distance that said smart plug is to be from said marine vehicle,
determining when said marine vehicle is within said geographic zone based on said geospatial data of said second geolocation device, and
transmitting a computer readable signal when said marine vehicle is within said geographic zone and said smart plug and said marine vehicle are outside said designated distance,
wherein said computer readable signal causes at least one of an output device and a computing entity to perform an action that will alert said user.

2. The system of claim 1, wherein said cavity is located within a male portion of said casing.

3. The system of claim 1, further comprising said computing entity operably connected to said processor,
wherein said computing entity is configured to receive said computer readable signal,
wherein a user interface of said computing entity is configured to receive said input from said user, and
wherein said user alters parameters of said geographic zone via said input within said user interface.

4. The system of claim 1, further comprising at least one sensor,
wherein said at least one sensor is configured to collect environmental data pertaining to environmental conditions about said smart plug.

5. The system of claim 4, further comprising additional instructions stored on said non-transitory computer-readable medium, which, when executed by said processor, cause said processor to perform additional operations comprising:
obtaining a threshold limit from said user profile,
wherein said threshold limit represents at least one of a maximum threshold value and a minimum threshold value for environmental data obtained by said at least one sensor,
receiving said environmental data from said at least one sensor, and
determining if said smart plug is outside of said threshold limit based on said environmental data.

6. The system of claim 5, further comprising further comprising said additional instructions stored on said non-transitory computer-readable medium, which, when executed by said processor, cause said processor to perform said additional operations comprising:
transmitting a computer readable signal when said marine vehicle is within said geographic zone and said environmental data is outside of said threshold limit.

7. The system of claim 1, wherein said casing comprises a male portion and female portion,
wherein said male portion and said female portion are configured to interlock,
wherein said female portion has at least one magnet having a magnetic field positioned within a drain hole of said female portion.

8. The system of claim 7, wherein said male portion comprises a magnetic field sensor,
wherein said magnetic field sensor is configured to obtain magnetic field data related to said magnetic field of said at least one magnet.

9. The system of claim 8, further comprising additional instructions stored on said non-transitory computer-readable medium, which, when executed by said processor, cause said processor to perform additional operations comprising:
obtaining a threshold limit from said user profile pertaining to a minimum field strength,
wherein said minimum field strength correlates to how tightly said male portion is interlocked with said female portion,
receiving said magnetic field data from said magnetic field sensor, and
determining if said male portion of said smart plug is positioned tightly within said female portion of said smart plug based on said threshold limit and said magnetic field data.

10. The system of claim 9, further comprising further comprising said additional instructions stored on said non-transitory computer-readable medium, which, when executed by said processor, cause said processor to perform said additional operations comprising:
transmitting said computer readable signal when said marine vehicle is within said geographic zone and said male portion is not positioned tightly within said female portion,
wherein said geographic zone instructs said processor that said marine vehicle is to be placed in water.

11. A system for tracking a position of a smart plug on a marine vehicle comprising,
a smart plug having a casing, control board, at least one sensor, and geolocation device,
wherein said control board is contained within a cavity of said casing,
wherein said at least one sensor is configured to collect environmental data pertaining to environmental conditions about said smart plug,
wherein said geolocation device is configured to collect geospatial data pertaining to a geolocation of said smart plug,
a processor operably connected to said smart plug, and
a non-transitory computer-readable medium coupled to said processor and having instructions stored thereon, which, when executed by said processor, cause said processor to perform operations comprising:

receiving said geospatial data from said geolocation device,
receiving said environmental data from said at least one sensor,
accessing a user profile of a user based on input of said user,
obtaining a geographic zone from said user profile,
obtaining a threshold limit from said user profile,
wherein said threshold limit represents at least one of a maximum threshold value and a minimum threshold value for environmental data obtained by said at least one sensor,
determining if said smart plug is outside of said threshold limit based on said environmental data,
determining when said marine vehicle is within said geographic zone based on said geospatial data, and
transmitting a computer readable signal when said marine vehicle is within said geographic zone and said environmental data is outside of said threshold limit,
wherein said computer readable signal causes at least one of an output device and a computing entity to perform an action that will alert said user.

12. The system of claim 11, wherein said cavity is located within a male portion of said casing.

13. The system of claim 11, further comprising said computing entity operably connected to said processor,
wherein said computing entity is configured to receive said computer readable signal,
wherein a user interface of said computing entity is configured to receive input from said user, and
wherein said user alters parameters of at least one of said geographic zone and said threshold limit via said input within said user interface.

14. The system of claim 11, wherein said casing comprises a male portion and female portion,
wherein said male portion and said female portion are configured to interlock,
wherein said female portion has at least one magnet having a magnetic field, and
wherein said magnetic field is positioned within a drain hole of said female portion.

15. The system of claim 14, wherein said at least one sensor is a magnetic field sensor,
wherein said environmental data obtained by said magnetic field sensor is magnetic field data related to said magnetic field of said at least one magnet.

16. The system of claim 15, further comprising additional instructions stored on said non-transitory computer-readable medium, which, when executed by said processor, cause said processor to perform additional operations comprising:
obtaining said threshold limit related to magnetic field data,
wherein said minimum threshold value pertains to a minimum field strength,
wherein said minimum field strength correlates to how tightly said male portion is interlocked with said female portion, and
determining if said male portion is positioned tightly within said female portion based on said threshold limit related to magnetic field data and said magnetic field data.

17. The system of claim 16, further comprising said additional instructions stored on said non-transitory computer-readable medium, which, when executed by said processor, cause said processor to perform said additional operations comprising:

transmitting said computer readable signal when said marine vehicle is within said geographic zone and said male portion is not positioned tightly within said female portion,
wherein said geographic zone instructs said processor that said marine vehicle is to be placed in water.

18. A method for tracking a position of a smart plug on a marine vehicle comprising steps of:
obtaining a smart plug having a casing, control board, at least one sensor, and geolocation device,
wherein said control board is contained within a cavity of said casing,
wherein said at least one sensor is configured to collect environmental data pertaining to environmental conditions about said smart plug,
wherein said geolocation device is configured to collect geospatial data pertaining to a geolocation of said smart plug,
obtaining a computing entity operably connected to said smart plug,
wherein said computing entity is configured to receive a computer readable signal,
wherein a user interface of said computing entity is configured to receive input from a user,
wherein said user alters parameters of at least one of a geographic zone and a threshold limit via said input within said user interface,
wherein said computing entity and said smart plug are operably connected to a processor,
installing a female portion of said smart plug about an item drain hole of an item,
wherein an aperture of said female portion of said smart plug aligns with said item drain hole,
wherein a male portion of said smart plug interlocks with said female portion and fills said aperture, and
monitoring said user interface of said computing entity for an alert indicating that said male portion is not tightly secured to said female portion.

19. The method of claim 18, wherein said computing entity further comprises a non-transitory computer-readable medium coupled to said processor and having instructions stored thereon, which, when executed by said processor, cause said processor to perform operations comprising:
receiving said geospatial data from said geolocation device,
receiving said environmental data from said at least one sensor,
accessing a user profile of a user based on input of said user,
obtaining a geographic zone from said user profile,
obtaining a threshold limit from said user profile,
wherein said threshold limit represents at least one of a maximum threshold value and a minimum threshold value for environmental data obtained by said at least one sensor,
determining when said smart plug is outside of said threshold limit based on said environmental data,
determining when said marine vehicle is within said geographic zone based on said geospatial data, and
transmitting a computer readable signal when said marine vehicle is within said geographic zone and said environmental data is outside of said threshold limit,
wherein said computer readable signal causes at least one of an output device and a computing entity to perform an action that will alert said user.

20. The method of claim 19, further comprising additional steps of:

twisting said male portion in a way such that said male portion is more tightly engaged with said female portion when said alert is provided via said computing entity.

* * * * *